(12) United States Patent
Sarkar et al.

(10) Patent No.: US 7,836,046 B2
(45) Date of Patent: Nov. 16, 2010

(54) METHOD AND SYSTEM FOR FACILITATING VERIFICATION OF AN ENTITY BASED ON BUSINESS REQUIREMENTS

(75) Inventors: Suman Kumar Sarkar, Karnataka (IN); Sanjeev Kumar Agarwal, Karnataka (IN)

(73) Assignee: Oracle Financial Services Software Limited, Mumbai (IN)

(*) Notice: Subject to any disclaimer, the term of this patent is extended or adjusted under 35 U.S.C. 154(b) by 359 days.

(21) Appl. No.: 12/017,054

(22) Filed: Jan. 21, 2008

(65) Prior Publication Data

US 2009/0187553 A1 Jul. 23, 2009

(51) Int. Cl.
G06F 17/30 (2006.01)
(52) U.S. Cl. .................. 707/723; 707/731; 726/27
(58) Field of Classification Search ............. 726/27–29; 707/723, 731
See application file for complete search history.

(56) References Cited

U.S. PATENT DOCUMENTS

| | | | |
|---|---|---|---|
| 5,805,832 A * | 9/1998 | Brown et al. ................ 711/1 |
| 7,284,271 B2 * | 10/2007 | Lucovsky et al. ............. 726/21 |
| 7,322,047 B2 * | 1/2008 | Redlich et al. .............. 726/27 |
| 7,334,130 B2 * | 2/2008 | Bowers .................... 713/186 |
| 7,363,504 B2 * | 4/2008 | Bonalle et al. ............. 713/186 |
| 2007/0162445 A1 * | 7/2007 | Scriffignano et al. ......... 707/6 |
| 2007/0180240 A1 * | 8/2007 | Dahl ..................... 713/165 |
| 2008/0114583 A1 * | 5/2008 | Al-Onaizan et al. .......... 704/2 |
| 2009/0019552 A1 * | 1/2009 | McLaughlin et al. ......... 726/27 |

* cited by examiner

*Primary Examiner*—Leslie Wong
(74) *Attorney, Agent, or Firm*—Narendra Reddy Thappeta

(57) ABSTRACT

A method, system and computer program product for facilitating verification of an entity against a reference database. The entity is characterized by corresponding attributes. The method obtains a set of attributes from the attributes based on a set of predefined parameters. Further, the method selects a set of algorithms corresponding to each attribute belonging to the set of attributes. Thereafter, the method executes one or more algorithms belonging to a set of algorithms corresponding to each attribute.

21 Claims, 7 Drawing Sheets

METHOD AND SYSTEM FOR FACILITATING VERIFICATION OF AN ENTITY BASED ON BUSINESS REQUIREMENTS

RELATED APPLICATIONS

Benefit is claimed under 35 U.S.C. 119(a)-(d) to Foreign application Ser. 1273/MUM/2007, entitled "Method and system for facilitating verification of an entity based on business requirements" by Suman Kumar Sarkar et al., filed on 3 Jul. 2007, which is herein incorporated in its entirety by reference for all purposes.

FIELD OF INVENTION

The present invention generally relates to the field of identity recognition. More specifically, the present invention relates to a method and system for facilitating verification of an entity based on business requirements.

BACKGROUND OF THE INVENTION

In today's information age, data has become a lifeline for most business establishments. Starting from financial institutions such as Banks to Medical Research Institutions performing genetic research, almost all business establishments generate and use a large amount of data. Many of such institutions frequently require matching a set of data with a reference data. For example, banks need to verify the identity of a person before accepting that person as a customer. Similarly, Medical Research Institutions may require DNA matching from a reference data set of known DNA structures. Most of such business establishments employ matching systems for matching a set of data with available reference data.

Typically, such matching systems represent a set of data which is to be matched as an entity. Depending upon requirements of a business establishment, examples of an entity can include, a person, a DNA sample, pixel representation of a photograph. An entity can have one or more attributes. Attributes of an entity defines characteristics of the entity. If an entity is a person, examples of attributes can include, a first name, a middle name a telephone number etc. Typically, for matching an entity against a reference set of entities, respective attributes of entities are matched. Based on degree of match between entities, an entity matching system may result in a True positive, a True negative, a False positive and a False negative. A True positive is a scenario when the entity matching system correctly determines two entities to be matching as confirmed by a human Expert. Similarly, a True negative is a scenario when the entity matching system correctly determines two entities to be non-matching as confirmed by a human Expert. Further, a False positive is a scenario when the entity matching system incorrectly determines two entities to be matching as confirmed by a human expert who determines the two entities to be non-matching. Similarly, a False negative is a scenario when the entity matching system incorrectly determines two entities to be non-matching as confirmed by a human expert who determines the two entities to be matching. It is hence the objective of any entity matching system, to minimize the number of false positives and false negatives. However, there exists an inverse correlation between the two and rigid applications of conventional systems typically only manage to reduce one at the expense of the other.

The process of entity matching becomes increasingly difficult as the entity becomes complex in its structure and the volume of data increases. For example, in the case of Name Screening, the matching of name entities against a reference set of names becomes difficult due to variations in, spelling, grammar, typographical errors, language, cultural differences, linguistic differences and phonetic differences as well as variations caused by punctuation.

There are a number of algorithms available for entity matching which address variations caused by one or more of, punctuation, cultural and phonetic differences. Some existing methods select algorithms based on the requirements of the business establishment and sequentially implement the algorithms for matching an entity. Such methods typically give equal importance to all the algorithms which are selected for a business establishment. However, some algorithms may be relatively more important compared to others for a particular business context. Similarly, some of the attributes may be relatively more important compared to other attributes. Conventional methods for entity matching typically implement algorithms in a sequential fashion and regardless of the relative importance of the algorithms and/or attributes involved. Such methods many a times result in False negatives or False positives depending on a rigidness of the method.

There is therefore a need for a method and system which facilitates verification of an entity by providing flexibility to assign a relative importance to a set of algorithms and attributes of the entity based on business requirements of a business establishment. There is further a need for a method and system which is highly flexible and maintains an optimal balance between False negatives and False positives.

SUMMARY OF THE INVENTION

An object of the present invention is to provide a method and system for facilitating verification of an entity against a reference database.

Another object of the present invention is to minimize False negatives and false positives.

The above objects are achieved by providing a method, system and computer program product for facilitating verification of an entity against a reference database. The entity comprises a plurality of attributes. The method comprises obtaining a set of attributes from the plurality of attributes based on a set of predefined parameters. The method further comprises selecting a set of algorithms corresponding to each attribute belonging to the set of attributes based on a set of predefined parameters. Thereafter, the method executes one or more algorithms belonging to a set of algorithms corresponding to each attribute.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
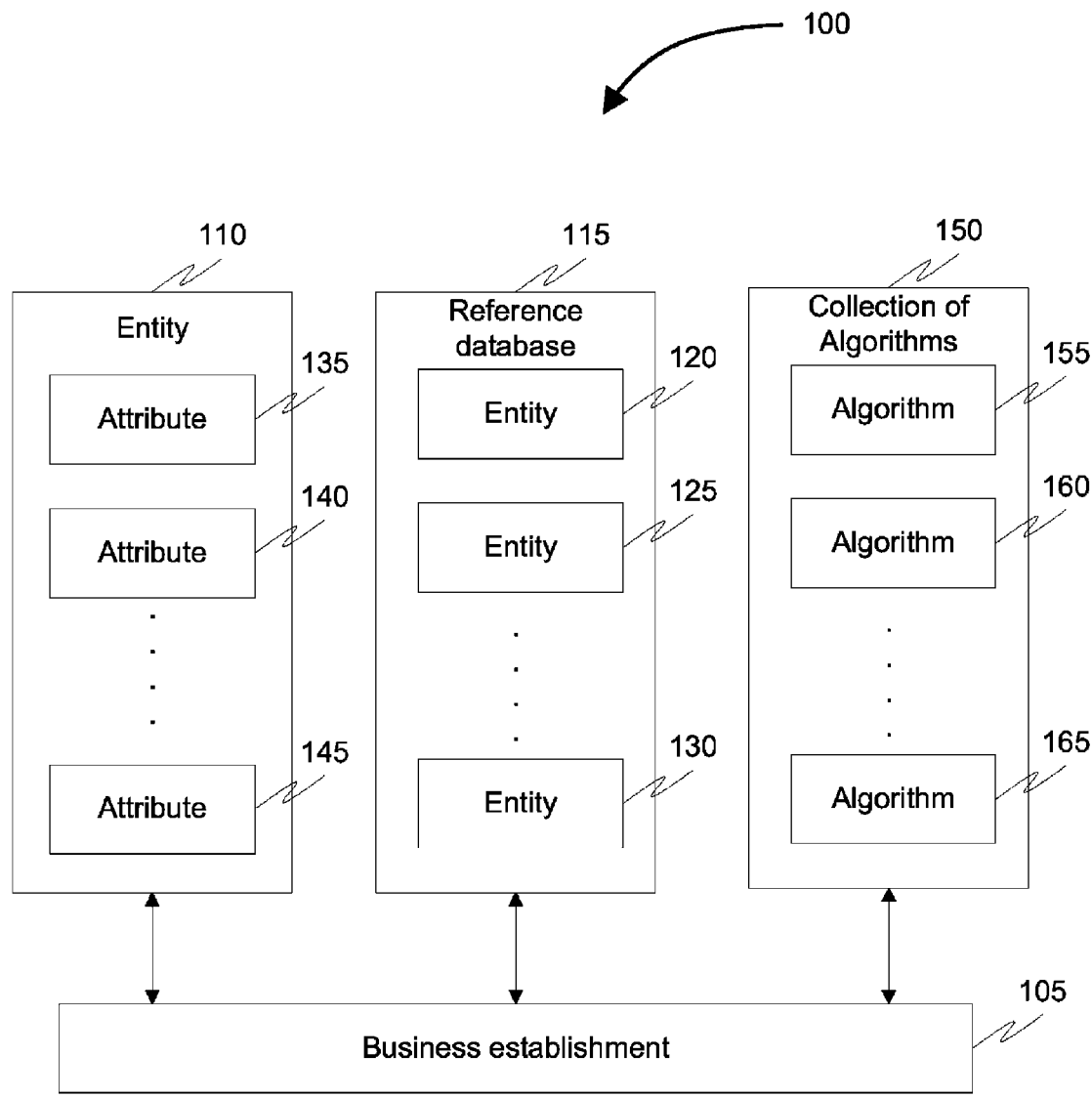
FIG. 1 is a block diagram depicting an exemplary environment in which the various embodiments of the present invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to method and system for facilitating verification of an entity against a reference database based on relative importance of attributes. Accordingly, the apparatus components and method steps have been represented where appropriate by conventional symbols in the drawings, depicting only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking pursuant to various embodiments, the present invention provides a method and system for facilitating verification of an entity against a reference database based on business requirements. More specifically, the present invention provides a method and system for matching an entity with one or more entities from a reference database based on the relative importance of one or more algorithms and one or more attributes of the entity. Further, the present invention provides a method and system for categorizing the one or more algorithms and one or more attributes of an entity into one or more categories based on business requirements of a business establishment. Also, the method and system facilitates assigning relative importance to these categories. Examples of an entity can include, but are not limited to, a person, an organization, a business establishment, a financial institution, pixel representations of a photograph and DNA samples. An entity can have any number of attributes. An attribute of an entity stores information corresponding to the entity. For instance if an entity is a person, attributes used to define the entity 'person' can include, but are not limited to, a first name of a person, a middle name of a person, a last name of a person, a nickname of a person, a driving license number of a person, a telephone number of a person, a date of birth of a person, Personal Account Number of a person. Similarly, if an entity is an organization, attributes used to define the entity 'organization' can include, but are not limited to, a name of an organization, a registration number of an organization and a location of an organization. For determining a degree of match between a first entity and a second entity, one or more attributes of the first entity are matched against corresponding attributes of the second entity. There are algorithms known in the art for matching such attributes. If an entity can be represented in text for example an entity 'person' and an entity 'organization', algorithms can take into account the differences in one or more of spelling, grammar, typographical errors, language and/or cultural differences and linguistic differences from one place to another. Typically, such algorithms generate a score corresponding to a degree of match between the attributes. One or more scores corresponding to the degree of match between one or more attributes of the first entity with corresponding attributes of the second entity can be used for determining an entity matching score.

Referring now to the drawings, and in particular, FIG. 1, a block diagram depicting an environment 100 is shown, in which various embodiments of the present invention may function. Environment 100 includes a business establishment 105 which performs entity matching for an entity 110. Examples of business establishment 105 can include, but are not limited to, a bank catering to its customers, an organization keeping track of its consumers and/or vendor organizations and an e-mail service keeping track of multiple accounts of same persons, a medical research institution tracking DNA samples etc. Alternatively, business establishment 105 can be a third party provider which provides entity matching service for other organizations. For example, service providers such as MasterCard™, Visa™ perform identity verification of a person for different banks to ensure secure transactions.

Environment 100 further includes a reference database 115. Reference database 115 includes an entity 120, an entity 125 and an entity 130. Further, each of entity 120, entity 125 and entity 130 has one or more attributes and the one or more attributes are stored in reference database 115. It will be apparent to a person skilled in the art that reference database 115 may include more than three entities. Reference database 115 can be maintained by business establishment 105. Alternatively, reference database 115 can be maintained by other organizations. For example, regulatory bodies maintain a database of people who are criminals, terrorists, malicious or suspicious customers, politically exposed persons, fraud account holders, bank defaulters and people linked with underworld.

Business establishment 105 uses reference database 115 for matching entity 110 against one or more entities stored in reference database 115. Entity 110 includes an attribute 135, an attribute 140 and an attribute 145. It will be apparent to a person skilled in the art that entity 110 may include more than three attributes. Environment 100 further includes a collection of algorithms 150 for matching entity 110 against one or more entities stored in reference database 115. Collection of algorithms 150 includes an algorithm 155, an algorithm 160 and an algorithm 165. One or more algorithms from collection of algorithms 150 are used for matching entity 110 against one or more entities stored in reference database 115. It will be apparent to a person skilled in the art that collection of algorithms 150 may include more than three algorithms.

One or more of algorithm 155, algorithm 160 and algorithm 165 are executed for calculating one or more entity matching scores for entity 110. Each of one or more entity matching scores for entity 110 indicates the degree of match between entity 110 and an entity from reference database 115. Entity 110 may be matched with each of entity 120, entity 125 and entity 130 stored in reference database 115. Alternatively, entity 110 may be matched from a reduced set of entities from reference database 115 by progressively decreasing number of entities to be matched. The number of entities to be matched is decreased based on the degree of match between one or more attributes of entity 110 and corresponding attributes of entities stored in reference database 115. This is explained in further detail in conjunction with FIG. 5.

Figure 2:
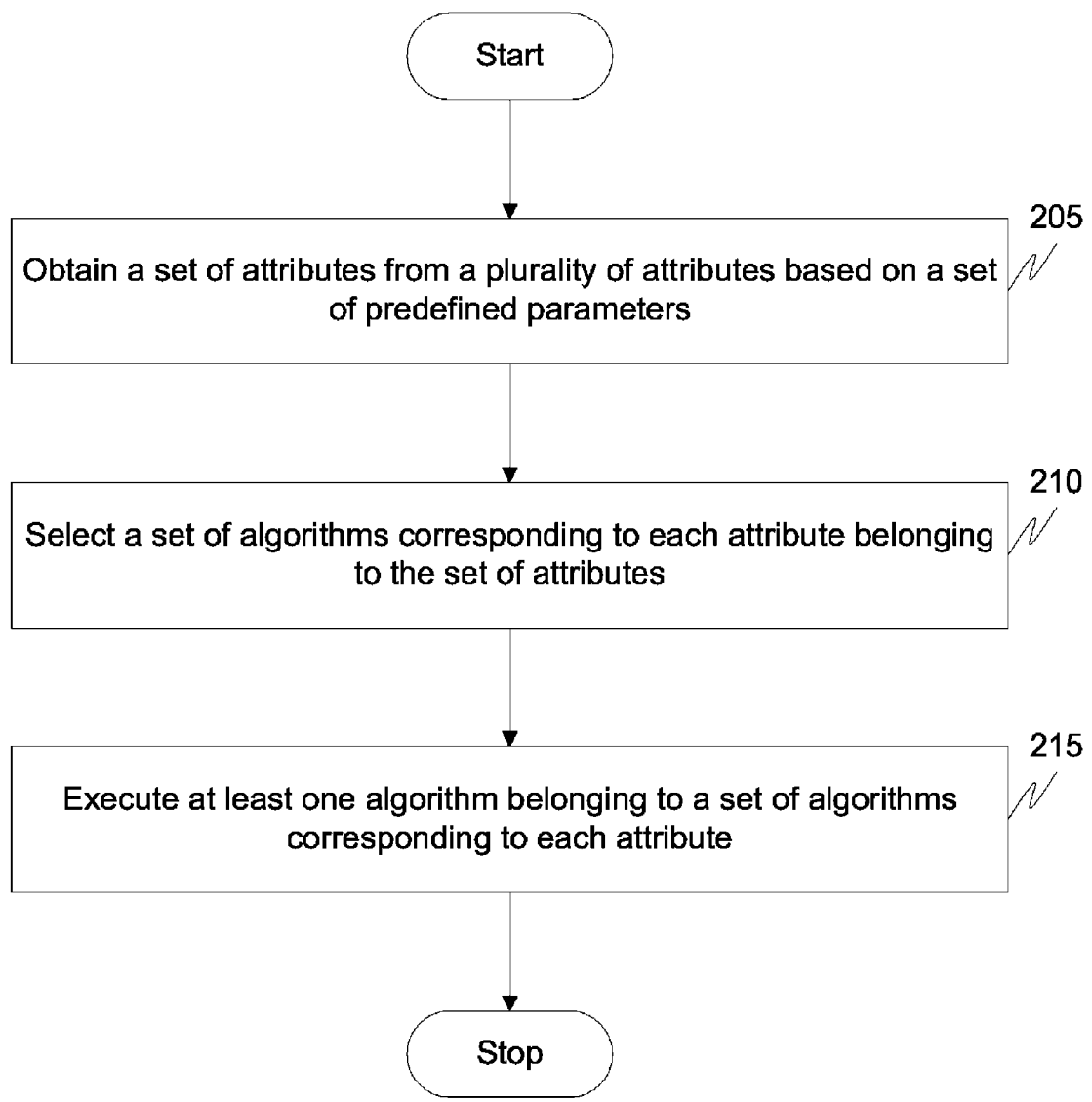
FIG. 2 is a flow diagram depicting a method for facilitating verification of an entity against a reference database, in accordance with an embodiment of the present invention.

Referring now to FIG. 2, a flow diagram depicting a method for facilitating verification of an entity against a reference database is shown, in accordance with an embodiment of the present invention. For facilitating verification of an entity, a set of attributes is obtained from a plurality of attributes corresponding to the entity based on a set of predefined parameters, at step 205. The set of predefined parameters for example, can be based on business requirements of business establishment 105. The business requirements may vary based on a business establishment. For example, if business establishment 105 is an Income Tax department, the attributes corresponding to the entity 'person' may include a name, a Permanent Account Number and a permanent address. Driving license details corresponding to the person may not be required in this case. However, if business establishment 105 is a Traffic Police department, the attributes corresponding to the entity 'person' may include a name, a driving license number and a permanent address. A Permanent Account Number corresponding to the person may not be required as an attribute in this case. In an embodiment of the present invention, a set of attributes corresponding to an entity can either be selected automatically or manually by a domain expert based on business requirements of a business establishment.

After obtaining the set of attributes, a set of algorithms is selected corresponding to each attribute belonging to the set of attributes at step 210. The set of algorithms includes one or more algorithms for matching an attribute. The one or more algorithms are selected so as to match one or more aspects of an attribute. If the entity can be represented in text The one or more aspects corresponding to an attribute can be for example, but are not limited to Phonetics, Phonometric Scoring, Simmetric/Distance Metrics, Hybrid, Token Swapping, Variation Generator, Exact String Matching, Stemming and Bit matching. In an exemplary embodiment of the present invention, if an attribute is a name, it may be required to match phonetic aspects of the name and edit distance of the name, with other entities in reference database 115. Therefore, one or more algorithms for matching the phonetic aspects and the edit distance are selected. It will be apparent to a person skilled in art that there may be any number of aspects of an attribute and a set of algorithms corresponding to the attribute can be selected to match one or more aspects of the attribute based on requirements of a business establishment. Further, one or more algorithms of the set of algorithms matching an aspect of the attribute may be further classified in an algorithm group and an algorithm category in the set of algorithms. This is further explained in detail in conjunction with FIG. 3. In an embodiment of the present invention, a set of algorithms corresponding to each attribute of an entity can either be selected automatically or manually by a domain expert based on the requirements of a business establishment. In an exemplary embodiment of the present invention, the domain expert may execute the set of algorithms on test data to further refine the set of algorithms.

Thereafter, at step 215 one or more algorithms belonging to the set of algorithms corresponding to each attribute are executed. When executed, each algorithm generates an algorithm score corresponding to an attribute. An algorithm score of an algorithm indicates a degree of match between the attributes based on the algorithm. In an embodiment of the present invention, the one or more algorithms can be executed in one or more of, a sequential manner and a parallel manner. This is further explained in detail in conjunction with FIG. 4.

Figure 3:
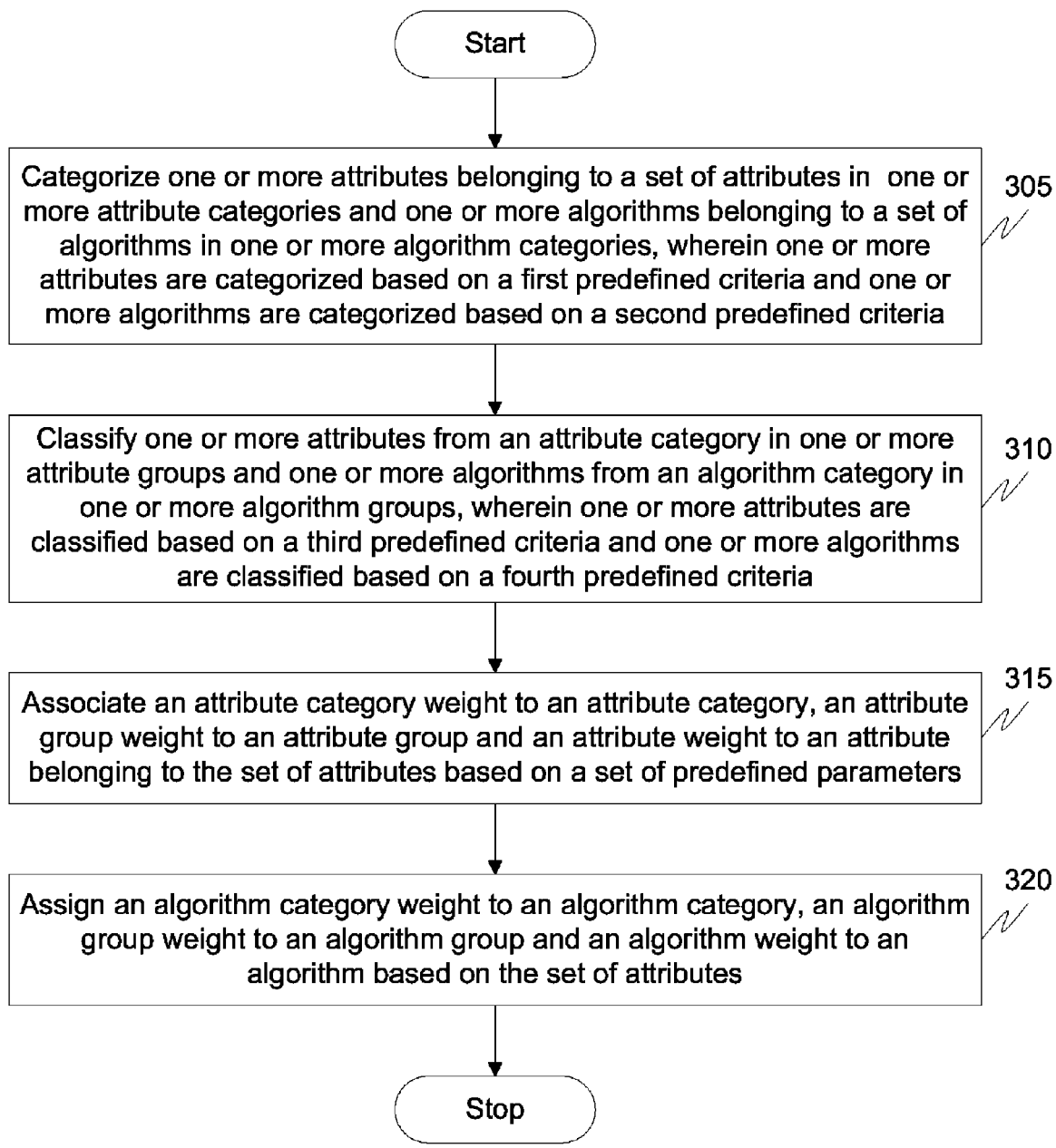
FIG. 3 is a flow diagram depicting a method for categorizing and classifying each of, one or more attributes and one or more algorithms, in accordance with an embodiment of the present invention.

Referring now to FIG. 3, a flow diagram depicting a method for categorizing and classifying each of, one or more attributes and one or more algorithms is shown, in accordance with an embodiment of the present invention. The set of attributes and the set of algorithms as obtained in step 205 and step 210, respectively, are categorized in one or more attribute categories and one or more algorithm categories at step 305. The set of attributes is categorized into one or more attribute categories based on a first predefined criteria. Also, the set of algorithms is categorized into one or more algorithm categories based on a second predefined criteria. In an embodiment of the present invention wherein the entity is a person, the one more attribute categories can include, but are not limited to, a name attribute category, a number attribute category and an address attribute category. Also, the one or more algorithm categories can include, but are not limited to, a phonetics algorithm category, a distance algorithm category, a phonometric scoring algorithm category, a distance metrics algorithm category, a hybrid algorithm category, a token swapping algorithm category, a variation generator algorithm category, an exact string matching algorithm category, a stemming algorithm category and a bit matching algorithm category.

In an embodiment of the present invention, the first predefined criteria include rules for categorizing one or more attributes in one or more attribute categories. Examples of first predefined criteria can include one or more of, but are not limited to, categorizing numbers in a first attribute category and categorizing names in a second attribute category. Similarly, the second predefined criteria include rules for categorizing one or more algorithms in one or more algorithm categories. Examples of second predefined criteria can include, but are not limited to, categorizing algorithms for matching phonetics of an attribute in a phonetics algorithm category and categorizing algorithms for matching edit distance of a name in an edit distance algorithm category.

In an exemplary embodiment of the present invention wherein the entity is a person, the set of attributes as obtained in obtaining step 205 can include a first name, a middle name, a last name, a nickname, an alias name, a passport number, a driving license number, a home telephone number, an office telephone number, a mobile number, a home address and an office address. Each of the first name, the middle name, the last name, the nickname and the alias name may be categorized in a name attribute category, based on the first predefined criteria. Further, each of the passport number, the driving license number, the home telephone number, the office telephone number and the mobile number may be categorized in a number attribute category, based on the first predefined criteria. Furthermore, each of the home address and the office address may be categorized in an address attribute category based on the first predefined criteria.

Thereafter, the set of algorithms as selected in selecting step 210 can include, a Caverphone algorithm, a Metaphone algorithm, a Soundex algorithm, a NYSIS algorithm for matching phonetics of an attribute, for instance, a first name of a person. Each of these algorithms may be categorized in a 'phonetics' algorithm category, based on the second predefined criteria.

Similarly, the set of algorithms can further include a Turbo-Boyer-Moore algorithm, an Apostolico-Crochemore algorithm, a Levenshtein Distance algorithm, a Smith-Waterman algorithm, an Editex algorithm, a LIG3 algorithm, a Jaccard Coefficient algorithm, an Overlap Coefficient algorithm, a Single Word Anagrams algorithm, a Forward Overlaps algorithm, an Ngram algorithm, a DirichletJS algorithm and a SLIMWinkler algorithm. Each of the Turbo-Boyer-Moore algorithm and the Apostolico-Crochemore algorithm may be categorized in an 'exact string matching' algorithm category, based on the second predefined criteria.

Further, each of the Levenshtein Distance algorithm and the Smith-Waterman algorithm may be categorized in an 'edit distance' algorithm category, based on the second predefined criteria. Similarly, each of the Editex algorithm and the LIG3 algorithm may be categorized in a 'hybrid' algorithm category and each of the Jaccard Coefficient algorithm and the Overlap Coefficient algorithm may be categorized in a 'token swapping' algorithm category.

Also, the Single Word Anagrams algorithm, the Forward Overlaps algorithm and the Ngram algorithm may be categorized in a 'variations' algorithm category. Similarly, the DirichletJS algorithm and the SLIMWinkler algorithm may be categorized in an 'others' algorithm category.

After categorizing step 305, one or more attributes from an attribute category are further classified in one or more attribute groups and one or more algorithms from an algorithm category are further classified in one or more algorithm groups, at step 310. The one or more attribute groups for example, can include, but are not limited to an official name attribute group, an other name attribute group, a contact number attribute group and a registration number attribute group. Similarly, the one or more algorithm groups can include for example, but are not limited to a language independent phonetics algorithm group and a language dependent phonetics algorithm group.

The one or more attributes are classified in one or more attribute groups based on a third predefined criteria and the one or more algorithms are classified in one or more algorithm groups based on a fourth predefined criteria. The third predefined criteria for example can include, but are not limited to classifying a nickname, an alias name and a name variation in an other name attribute group, classifying a home telephone number, an office telephone number and a mobile number in a contact number attribute group and classify a first name, a middle name and a last name in an official name attribute group etc.

The fourth predefined criteria for example can include, but are not limited to, classifying language dependent algorithms for matching phonetics of an attribute in a language dependent phonetics algorithm group and classifying language independent algorithms for matching phonetics of an attribute in a language independent phonetics algorithm group. As mentioned earlier, an attribute is associated with a set of algorithms. Therefore, for each attribute, a set of algorithms corresponding to the attribute may be categorized in one or more algorithm categories at step 305. Further, at step 310 each algorithm from the one or more algorithm categories may be classified in one or more algorithm groups.

In an exemplary embodiment of the present invention, if an attribute category is a name attribute category, comprising a first name, a middle name, a last name, a nickname, an alias name and a name variation. A nickname of a person may be special name assigned to a person which may be culture dependent. For example, a person named 'Richard' may also be called as Dick, a lady 'Angela' may be referred to as Jane. Similarly, an alias name may be another name given to a person, for example, HIZBALLAH is also known as 'PARTY OF GOD'. Further, a name variation is culture dependent pronunciation variation. For example, HIZBALLAH can also be referred as HEZBALLAH or HEZBULLAH or HIZBOLLAH and so on. Each of the first name, the middle name and the last name may be further classified in an official name attribute group and each of the nickname, the alias name and the name variation may be further classified in an other name attribute group based on the third predefined criteria. Similarly, if an attribute category is a number attribute category comprising a passport number, a driving license number, a home telephone number, an office telephone number and a mobile number. Each of the passport number, the driving license number can be further classified in a registration number attribute group and each of the home telephone number, the office telephone number and the mobile number can be further classified in a contact number attribute group based on the third predefined criteria. For clarification purpose, the abovementioned example is further depicted in Table. 1

TABLE 1

| Attribute Category | Attributes | Attribute Group |
|---|---|---|
| Name attribute category | First name | Official name attribute group |
| | Middle name | Official name attribute group |
| | Last name | Official name attribute group |
| | Nickname | Other name attribute group |
| | Alias name | Other name attribute group |
| | Name variation | Other name attribute group |
| Number attribute category | Passport number | Registration number attribute group |
| | Driving license number | Registration number attribute group |
| | Home telephone number | Contact number attribute group |
| | Office telephone number | Contact number attribute group |
| | Mobile number | Contact number attribute group |

In another exemplary embodiment of the present invention, for instance, if a phonetics algorithm category includes a Soundex algorithm, a NYSIIS algorithm, a Metaphone algorithm and a Double Metaphone algorithm. Each of the Soundex algorithm and the NYSIIS algorithm may be classified in a language dependent phonetics algorithm group, based on the fourth predefined criteria. Further, each of the Metaphone algorithm and the Double Metaphone algorithm may be classified in a language independent phonetics algorithm group, based on the fourth predefined criteria. For clarification purpose, the abovementioned example is further depicted in Table. 2

TABLE 2

| Algorithm category | Algorithm name | Algorithm group |
|---|---|---|
| Phonetics algorithm category | Soundex algorithm | Language dependent phonetics algorithm group |

TABLE 2-continued

| Algorithm category | Algorithm name | Algorithm group |
|---|---|---|
| | NYSIIS algorithm | Language dependent phonetics algorithm group |
| | Metaphone algorithm | Language independent phonetics algorithm group |
| | Double Metaphone algorithm | Language independent phonetics algorithm group |
| Edit Distance algorithm category | Levenshtein Distance algorithm | Edit Distance algorithm group |
| | Smith-Waterman algorithm | Edit Distance algorithm group |
| Hybrid algorithm category | Editex algorithm | Hybrid algorithm group |
| | LIG3 algorithm | Hybrid algorithm group |
| Token swapping algorithm category | Jaccard Coefficient algorithm | Token swapping algorithm group |
| | Overlap Coefficient algorithm | Token swapping algorithm group |
| Exact string matching algorithm category | Turbo-Boyer-Moore algorithm | Exact string matching algorithm group |
| | Apostolico-Crochemore algorithm | Exact string matching algorithm group |
| Variations algorithm category | Single Word Anagrams algorithm | Variations algorithm group |
| | Forward Overlaps algorithm | Variations algorithm group |
| | Ngram algorithm | Variations algorithm group |
| Others algorithm category | DirichletJS algorithm the | Others algorithm group |
| | SLIMWinkler algorithm | Others algorithm group |

An algorithm category may include single algorithm group, for instance in example of Table. 2, each of the Edit Distance algorithm category, the Hybrid algorithm category, the Token swapping algorithm category, the Exact string matching algorithm category, the Variations algorithm category and the Others algorithm category include one algorithm group. In an embodiment of the present invention, such algorithm groups may be categorized in a Combined algorithm category. Therefore, for example of Table 2, each of the Edit Distance algorithm group, the Hybrid algorithm group, the Token swapping algorithm group, the Exact string matching algorithm group, the Variations algorithm group and the Others algorithm group may be categorized in a Combined algorithm category.

Thereafter, at step 315, an attribute category weight is associated with an attribute category, an attribute group weight is associated with an attribute group, and an attribute weight is associated with an attribute. The attribute category weight, the attribute group weight and the attribute weight are associated based on the set of predefined parameters. As explained in conjunction with FIG. 2, the set of predefined parameters can be based on business requirements of a business establishment. Therefore, relative importance of the attributes may vary depending upon the business requirements of the business establishment. For example, for an Income Tax department, relative importance of an attribute corresponding to a Personal Account Number is higher compared to an attribute corresponding to a driving license number. Similarly, for a Traffic Police department, relative importance of an attribute corresponding to driving license number is higher compared to an attribute corresponding to a Personal Account Number. Also, in case of Banks, relative importance of an attribute corresponding to a middle name of a customer may be lower compared to attributes corresponding to a first name and a last name of the customer.

Consequently, the attribute category weight, the attribute group weight and the attribute weight are associated based on the relative importance of the attributes for a business establishment. An attribute with a higher relative importance can be associated with a higher attribute weight compared to other attributes in an attribute group. For example, as mentioned earlier, in the case of a business establishment such as a bank, a middle name attribute from an official name attribute group (including a first name, a middle name and a last name) may be associated with a lower attribute weight compared to either of a first name attribute or a last name attribute. Similarly, an attribute group with a higher relative importance can be associated with a higher attribute group weight compared to other attribute groups in an attribute category. Correspondingly, an attribute category with a higher relative importance can be associated with a higher attribute category weight compared to other attribute categories corresponding to an entity.

In an embodiment of the present invention, each of an attribute category weight, an attribute group weight and an attribute weight is relative weight. Therefore, sum of each attribute weight in an attribute group is 100. Similarly, sum of each attribute group weight in an attribute category is 100 and sum of each attribute category weight corresponding to an entity is 100. Further, in an embodiment of the present invention, each of the attribute category weight, the attribute group weight and the attribute weight can either be associated automatically or manually by a domain expert based on business requirements of a business establishment.

Thereafter, an algorithm category weight is assigned to an algorithm category, an algorithm group weight is assigned to an algorithm group, and an algorithm weight is assigned to an algorithm, at step 320. Each of the algorithm category weight, the algorithm group weight and the algorithm weight is assigned based on the set of attributes. As mentioned earlier, each attribute of the set of attributes is associated with a set of algorithms. One or more algorithms from the set of algorithms may further be classified in one or more algorithm categories and within each algorithm category, one or more algorithms may further be classified into one or more algorithm groups. At step 320, each algorithm category belonging to a set of algorithms, is assigned an algorithm category weight based on an attribute corresponding to the set of algorithms.

An algorithm category may include one or more algorithms which may have a higher relative importance depending on an attribute. Consider an exemplary scenario wherein, an attribute is a first name, and a set of algorithms is categorized in a first algorithm category and a second algorithm category. The first algorithm category includes algorithms for matching phonetics of the first name. Further, the second algorithm category includes algorithms for matching based on distance of the first name. The first algorithm category may be assigned a higher relative importance compared to the second algorithm category based on business requirements. Therefore, an algorithm category weight assigned to the first algorithm category may be relatively higher than an algorithm category weight assigned to the second algorithm category.

Further, each algorithm group in an algorithm category is assigned an algorithm group weight based on an attribute associated with the set of algorithms. Similarly, each algorithm in an algorithm group is assigned an algorithm weight based on an attribute corresponding to the set of algorithms. In an embodiment of the present invention, one or more algorithm weights are dynamic algorithm weights. A dynamic algorithm weight corresponding to an algorithm is assigned dynamically based on an algorithm score of the algorithm. In a further embodiment of the present invention, a dynamic algorithm weight corresponding to an algorithm may be equal to an algorithm score of the algorithm.

It will be apparent that, in a manner similar to an algorithm category, an algorithm group in an algorithm category may have a higher relative importance compared to other algorithm groups in the algorithm category, based on an attribute. Also, it will be apparent that an algorithm in an algorithm group may have a higher relative importance compared to other algorithms in the algorithm group, based on an attribute. In such cases, an algorithm group may be assigned a higher relative weight compared to other algorithm groups in the algorithm category and an algorithm may be assigned a higher relative weight compared to other algorithms in the algorithm group. In an embodiment of the present invention each of the algorithm category weight, the algorithm group weight and the algorithm weight is assigned by a domain expert. The domain expert may execute the set of algorithms on a test data and based on the results obtained can further refine algorithm weights assigned to algorithms.

In an embodiment of the present invention, the algorithm category weight, the algorithm group weight and the algorithm weight are relative weights. Therefore, sum of each algorithm weight in an algorithm group is 100. Similarly, sum of each algorithm group weight in an algorithm category is 100 and sum of each algorithm category weight corresponding to an attribute is 100. Further, in an embodiment of the present invention, each of the algorithm category weight, the algorithm group weight and the algorithm weight can either be assigned automatically or manually by a domain expert based on business requirements of a business establishment.

Figure 4:
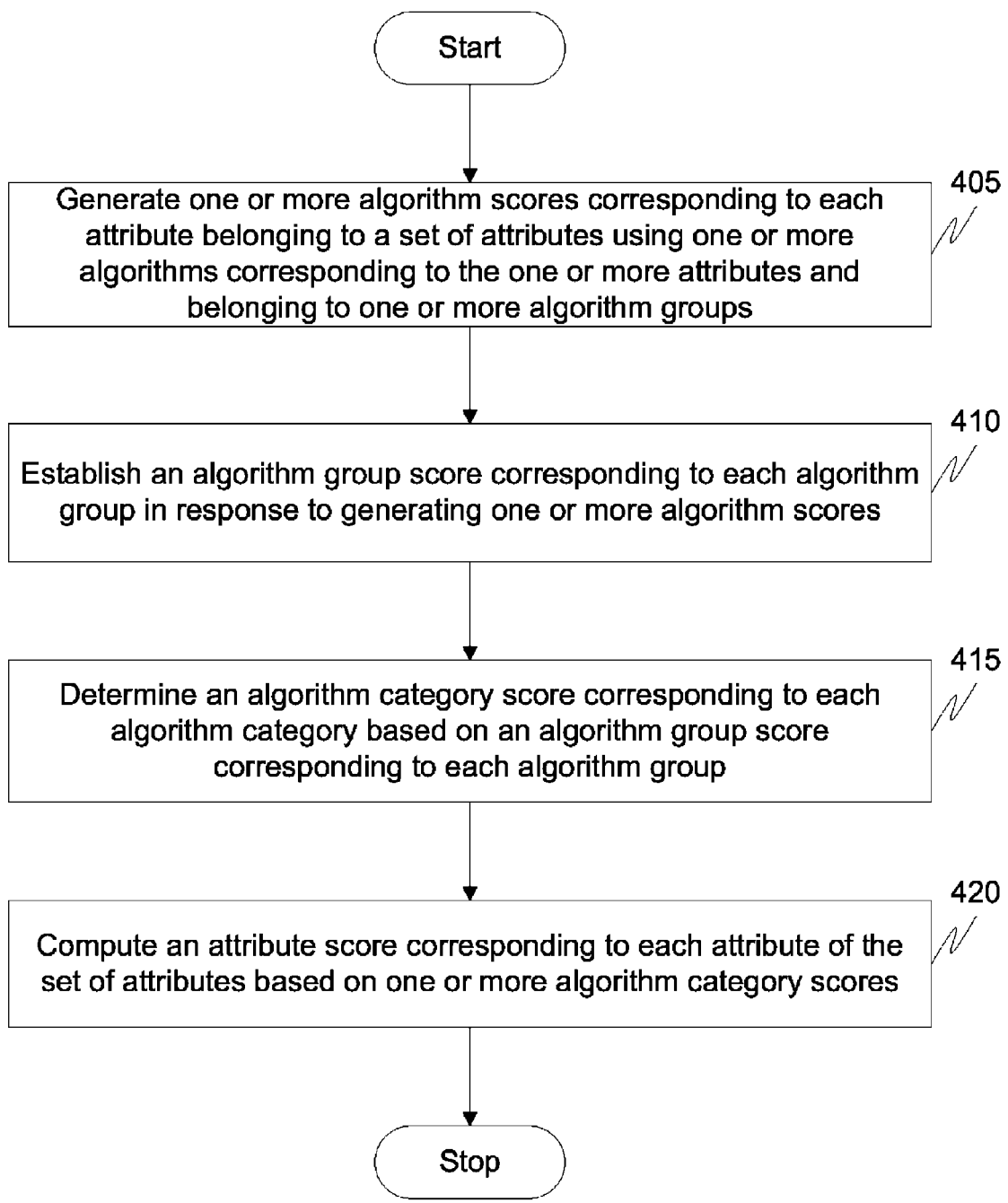
FIG. 4 is a flow diagram depicting a method for executing one or more algorithms from a set of algorithms, in accordance with an embodiment of the present invention.

Referring now to FIG. 4, a flow diagram depicting a method for executing one or more algorithms from a set of algorithms is shown, in accordance with an embodiment of the present invention. One or more algorithm scores are generated corresponding to one or more attributes belonging to a set of attributes using one or more algorithms belonging to one or more algorithm groups, at step 405. As mentioned earlier, an attribute is associated with a set of algorithms. One or more algorithms from the set of algorithms may be executed for generating an algorithm score corresponding to each of the one or more algorithms. A threshold algorithm score can be assigned to each of the one or more algorithms.

For a pass outcome for an algorithm, an algorithm score of the algorithm should be greater than a threshold algorithm score of the algorithm.

In an embodiment of the present invention, one or more algorithms from an algorithm group must have a pass outcome for the algorithm group to have a pass outcome. As an exemplary case, consider a first algorithm group comprising each of a first algorithm, a second algorithm and a third algorithm, further a second algorithm group comprising a fourth algorithm and a fifth algorithm. For the first algorithm group to have a pass outcome one or more of the first algorithm, the second algorithm and the third algorithm need to have a pass outcome. Similarly, for a pass outcome for the second algorithm group, one or more of the fourth algorithm and the fifth algorithm need to have a pass outcome. The one or more algorithms in an algorithm group may be executed in one or more of a sequential manner and a parallel manner.

An algorithm score corresponding to an algorithm can be based on any scale depending on the algorithm. For example, a first algorithm may result in a first algorithm score on a 1000 point scale, and a second algorithm may result in a second algorithm score on a 100 point scale. Further, an algorithm score corresponding to an algorithm need not necessarily be directly proportional to the degree of match between attributes matched by the algorithm. For instance, a high algorithm score for a Levenstein algorithm signifies a low degree of match between attributes. However, a high algorithm score for a Level2MongeElkan algorithm signifies a high degree of match between the attributes. Therefore, each algorithm score needs to be further processed to take into account the degree of match implied by the algorithm score. In an embodiment of the present invention, each algorithm score is scaled to a common scale using a score scaling method, in order to take into account the difference in scales of one or more algorithms. In a further embodiment of the present invention, each algorithm score is normalized using a score normalization method for taking into account the degree of match as implied by an algorithm score.

Further, at step 410 one or more algorithm group scores corresponding to one or more algorithm groups are established. The one or more algorithm group scores are established using each of one or more algorithm scores as generated in step 405 and one or more algorithm weights as assigned in step 320. In an embodiment of the present invention, each of the one or more algorithm group scores is a weighted average algorithm group score. A weighted average algorithm group score can be established by calculating a weighted average of algorithm scores using algorithm weights of algorithms in an algorithm group. In an embodiment of the present invention, the weighted average algorithm group score is established by calculating a weighted average of algorithm scores using dynamic algorithm weights of algorithms in an algorithm group. As mentioned earlier, a dynamic algorithm weight of an algorithm is based on the algorithm score of the algorithm.

A weighted average algorithm group weight (WAAGW) may be calculated using equation 1.

$$WAAGW = \Sigma(W_i \times S_i) \div \Sigma(W_i) \qquad (1)$$

where,

WAAGW is weighted average algorithm group weight for an algorithm group, $W_i$ represents algorithm weight assigned to an algorithm, and $S_i$ represents algorithm scores of an algorithm.

For purpose of illustration, consider an algorithm group comprising three algorithms. The three algorithms result in corresponding algorithm scores of 30, 80 and 90. If dynamic algorithm weights are used for calculating WAAGW, then an algorithm weight of an algorithm may be equal to an algorithm score of the algorithm. Consequently, for this case, $W_i$ become equal to $S_i$ and the WAAGW may be calculated as 77 using equation 1. Alternatively, in another case, the weighted average algorithm group weight may be calculated as a linear combination of algorithm scores. In such case, $W_i$ may become equal and the WAAGW may be calculated as 67 using equation 1.

In an embodiment of the present invention, a threshold algorithm group score may be assigned to each algorithm group. For a pass outcome for an algorithm group, an algorithm score of one or more algorithms in the algorithm group should be greater than a threshold algorithm score corresponding to the one or more algorithms. Further, an algorithm group score corresponding to the algorithm group should also be greater than a corresponding threshold algorithm group score for a pass outcome for the algorithm group.

In an embodiment of the present invention, one or more algorithm scores are scaled to a common scale before calculating an algorithm group score. The one or more algorithm scores may be scaled using a score scaling method. For example, if a first algorithm results in a first algorithm score of 750 on a 1000 point scale, and a second algorithm results in a second algorithm score of −50 on a −100 point scale. Each of the first algorithm score and the second algorithm score may be scaled to a common scale, for instance, 100 point scale using a score scaling method. In such a case, the first algorithm score becomes 75 and the second algorithm score becomes 50. Thereafter, these scores may further be normalized using a score normalization method to obtain a final algorithm scores. The scores need to be normalized for taking into account degree of match as implied by the algorithm scores. Therefore, if the first algorithm of the above example is such that the first algorithm score implies a low matching for a high score. Then, the first algorithm score of the above example may be normalized. Therefore, the first algorithm score in this example becomes equal to 250. In an embodiment of the present invention the score scaling method is performed after the score normalization method.

After establishing one or more algorithm group scores, an algorithm category score is determined corresponding to each algorithm category, at step 415. Algorithm category scores are determined using each of, one or more algorithm group scores as established in step 410 and one or more algorithm group weights as assigned in step 320. In an embodiment of the present invention, each algorithm category score is a weighted average algorithm category score. The weighted average algorithm category score can be calculated by taking a weighted average of algorithm group scores using algorithm group weights of one or more algorithm groups in an algorithm category.

For a pass outcome for an algorithm category, one or more algorithm groups must have a pass outcome for the algorithm category. For example, considering a first algorithm category comprising a first algorithm group, a second algorithm group and a third algorithm group. The first algorithm category has a pass outcome if one or more of the first algorithm group, the second algorithm group and the third algorithm group have a pass outcome.

After determining an algorithm category score corresponding to each algorithm category, an attribute score corresponding to each attribute belonging to a set of attributes is computed, at step 420. An attribute score is computed using each of, one or more algorithm category scores as determined in step 415 and one or more algorithm category weights as assigned in step 320. In an embodiment of the present invention, each attribute score is a weighted average attribute score. A weighted average attribute score for an attribute can be calculated by taking a weighted average of algorithm category scores using algorithm category weights of each algorithm category corresponding to the attribute. For a pass outcome for an attribute, each algorithm category corresponding to the attribute should have a pass outcome.

Consider an exemplary scenario wherein, a set of algorithms corresponding to a first attribute is categorized into a first algorithm category and a second algorithm category. The first algorithm category is further classified in a first algorithm group and a second algorithm group and the second algorithm category is classified in a third algorithm group and a fourth algorithm group. As mentioned earlier, for a pass outcome of the first attribute, each of the first algorithm category and the second algorithm category need to have a pass outcome. Also, for a pass outcome of the first algorithm category one or more of the first algorithm group and the second algorithm group should have a pass outcome. Further, for the second algorithm category to have a pass outcome, one or more of the third algorithm group and the fourth algorithm group should have a pass outcome. Also, for an algorithm group to have a pass outcome, algorithm scores of one or more algorithms of the algorithm group should be greater than threshold algorithm scores corresponding to the one or more algorithms. Additionally, an algorithm group score of the algorithm group should also be greater than a corresponding threshold algorithm group score for the algorithm group to have a pass outcome.

Figure 5:
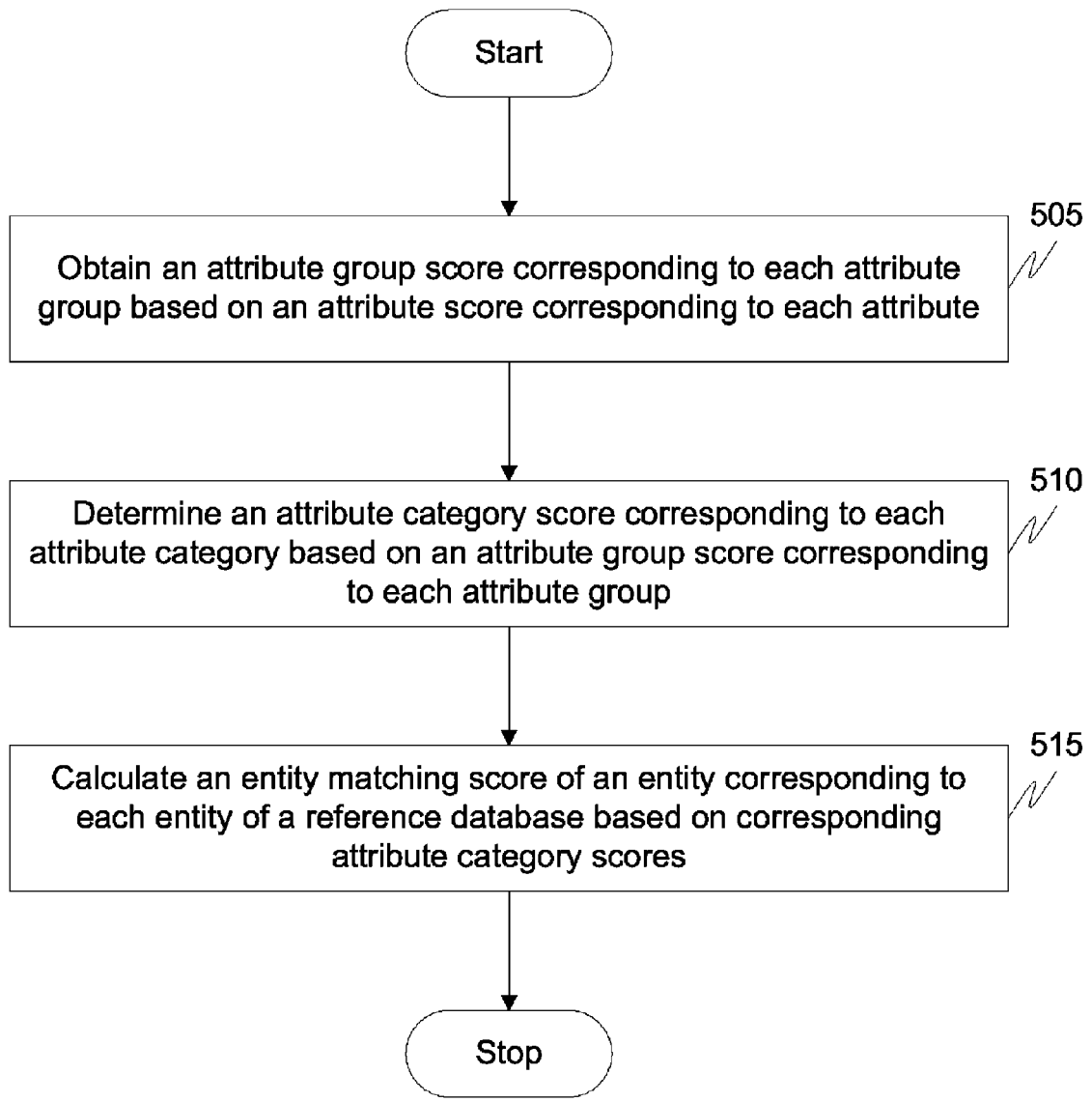
FIG. 5 is a flow diagram depicting a method for calculating an entity matching score corresponding to an entity, in accordance with an embodiment of the present invention.

Referring now to FIG. 5, a flow diagram depicting a method for calculating an entity matching score corresponding to an entity is shown, in accordance with an embodiment of the present invention. After computing an attribute score corresponding to each attribute of a set of attributes, an attribute group score corresponding to each attribute group is obtained, at step 505. An attribute group score is obtained using each of, one or more attribute scores as computed at step 420 and one or more attribute weights as associated in step 315. In an embodiment of the present invention, each attribute group score is a weighted average attribute group score. The weighted average attribute group score is obtained by calculating weighted average of attribute scores using attribute weights of each attribute in an attribute group. A threshold attribute score is assigned to each attribute. For a pass outcome for an attribute group, an attribute score of one or more attributes in the attribute group should be greater than a corresponding threshold attribute score of the one or more attributes. Additionally, the attribute group score for the attribute group should also be greater than a threshold attribute group score for pass outcome of the attribute group.

As an exemplary scenario, consider a first attribute group having a first threshold attribute group score. The first attribute group includes a first attribute and a second attribute. The first attribute has a first attribute score as computed at step 420, and a first threshold attribute score. Similarly, the second attribute has a second attribute score, as computed at step 420, and a second threshold attribute score. A first attribute group score is obtained corresponding to the first attribute at step 505. For a pass outcome of the first attribute group, one or more of the first attribute score and the second attribute score must be greater than the first threshold attribute score and the second threshold attribute score respectively. Additionally, the first attribute group score should also be greater than the first threshold attribute group score for pass outcome for the first attribute group.

After obtaining an attribute group score corresponding to each attribute group, an attribute category score corresponding to each attribute category is determined, at step 510. The attribute category scores are determined using each of, one or more attribute group scores as obtained in step 505 and one or more attribute group weights as associated in step 315. In an embodiment of the present invention, each attribute category score is a weighted average attribute category score. The weighted average attribute category score can be determined by calculating weighted average of attribute group scores using attribute group weights of each attribute group in an attribute category. For a pass outcome for an attribute category, one or more attribute groups need to have a pass outcome for the attribute category. Additionally, the attribute category score for the attribute category should also be greater than a threshold attribute category score for pass outcome of the attribute category. For example, consider a first attribute category comprising a first attribute group, a second attribute group and a third attribute group. The first attribute category has a pass outcome if one or more of the first attribute group, the second attribute group and the third attribute group have a pass outcome.

Thereafter, at step 515, an entity matching score of an entity corresponding to each entity of a reference database is calculated. The entity matching score corresponding to an entity is calculated based on corresponding attribute category scores. The entity matching score is calculated using each of, one or more attribute category scores as determined in step 510 and one or more attribute category weights as associated in step 315. In an embodiment an entity matching score is a weighted average entity matching score. The weighted average entity matching score for an entity can be calculated by calculating a weighted average of attribute category scores using attribute category weights of each attribute category corresponding to the entity. For a pass outcome for an entity, one or more attribute categories corresponding to the entity should have a pass outcome. The pass outcome criterion for an attribute category is discussed in conjunction with step 510. In an embodiment of the present invention, each entity matching score of an entity corresponding to each entity of a reference database is displayed to a user for verification and one or more entity matching scores are validated if the one or more entity matching scores are greater than a predefined threshold entity matching score.

Consider an exemplary case, wherein a bank needs to match an identity of a person using a risk database. A plurality of attributes that may be used to define the person may include a first name (FN), a last name (LN), an Also Known As (AKA) name, a mobile number, a home telephone number and an office telephone number. As explained earlier, a domain expert may categorize each of the FN, the MN, the LN and the AKA name in a name attribute category. Also, each of the mobile number, the home telephone number and the office telephone number in a contact number attribute category. The domain expert may further classify the FN, the MN and the LN in an official name attribute group and the AKA name in a nickname attribute group.

Thereafter, based on the requirements of the bank a domain expert assigns relative attribute weight to each of the FN, the LN, the AKA name, the mobile number, the home telephone number and the office telephone number based on their relevance. Subsequently, relative attribute group weights are associated with the official name attribute group and the nickname attribute group. Similarly, relative attribute category weights are associated with each of the name attribute category and the contact number attribute category based on their relevance.

The domain expert further selects a set of algorithms for each of the abovementioned attributes. For instance, a set of algorithm specific for the FN may include a Soundex algorithm, a NYSIIS algorithm, a Metaphone algorithm, a Double Metaphone algorithm, a Levenshtein Distance algorithm and a Smith-Waterman algorithm. Each of the Soundex algorithm, the NYSIIS algorithm, the Metaphone algorithm and the Double Metaphone algorithm are categorized into a Phonetics algorithm category. Similarly, the Levenshtein Distance algorithm and the Smith-Waterman algorithm are categorized in an Edit Distance algorithm category. Further, the Soundex algorithm, and the NYSIIS algorithm may be classified in a language dependent phonetics algorithm group. Thereafter, the Metaphone algorithm and the Double Metaphone algorithm may be classified in a language independent phonetics algorithm group. Similarly, algorithms from the Edit Distance algorithm category are also classified into one or more algorithm groups. As described in case of the FN, set of algorithms specific to the LN, the AKA name, the mobile number, the home telephone number and the office telephone number, are also classified into one or more algorithm categories and further into one or more algorithm groups.

After classifying algorithms, the domain expert assigns relative algorithm category weights to all algorithm categories. For instance, in case of the FN, relative algorithm category weights are assigned to the Phonetics algorithm category and Edit Distance algorithm category based on their relevance.

In order to verify the identity of the person, one or more attributes as mentioned above are matched against corresponding attributes in the risk database. For example, if the person is 'Richard MacManus' having AKA name as 'Dick', 'Richard' is matched with corresponding FN of each entity in the risk database. For this purpose, one or more algorithms from the set of algorithms corresponding to the FN as selected previously, are executed. For instance, the Soundex algorithm and the NYSIIS algorithm are executed. Each of the Soundex algorithm and the NYSIIS algorithm results in an algorithm score. Thereafter, using each algorithm score and the algorithm weights assigned to the Soundex algorithm and the NYSIIS algorithm, an algorithm group score for language dependent phonetics algorithm group is calculated. Similarly, algorithm group scores for each algorithm group of the Phonetics algorithm category and the Edit Distance algorithm category are calculated. Similarly, 'MacManus' and 'Dick' are matched with corresponding LN and AKA name of each attribute in the risk database.

Using the abovementioned algorithm group scores, an algorithm category score is calculated for the Phonetics algorithm category. The algorithm category score is calculated using algorithm group scores and algorithm group weights of the language dependent phonetics algorithm group and the language independent phonetics algorithm group. Similarly, an algorithm category score for the Edit Distance algorithm category is calculated. Using algorithm category scores for each of the Phonetics algorithm category and the Edit Distance algorithm category, attribute scores for the FN 'Richard', the LN 'MacManus' and the AKA name 'Dick' are obtained. Thereafter, using the attribute scores corresponding to the FN 'Richard', the LN 'MacManus' and the AKA name 'Dick', an entity matching score is computed for the person 'Richard MacManus'.

Figure 6:
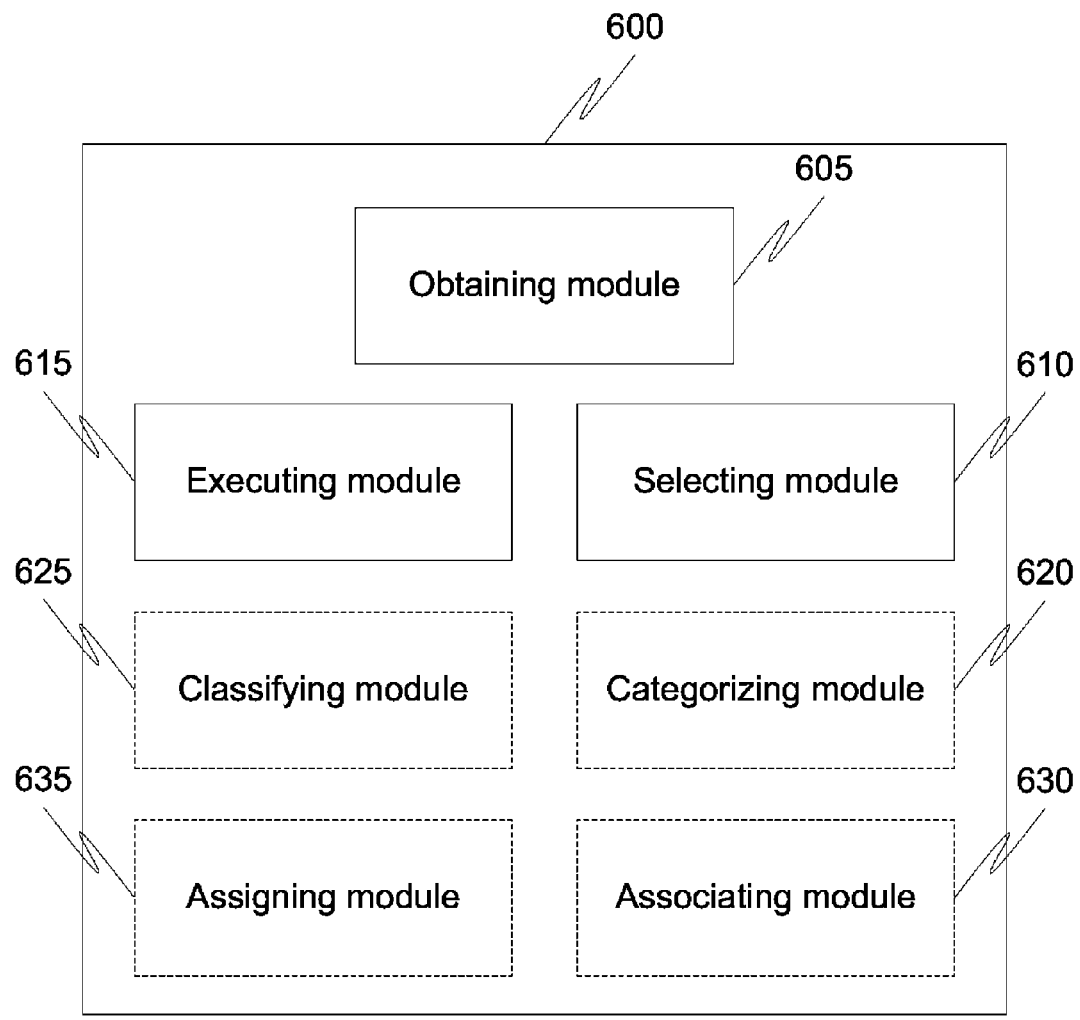
FIG. 6 is a block diagram depicting a system for facilitating verification of an entity against a reference database, in accordance with an embodiment of the present invention.

Referring now to FIG. 6, a block diagram depicting a system 600 for facilitating verification of an entity against a reference database is shown, in accordance with an embodiment of the present invention. For facilitating verification of an entity, a set of attributes is obtained from a plurality of attributes based on a set of predefined parameters by an obtaining module 605. The set of predefined parameters can be based on business requirements of business establishment 105. Business requirements may vary for different business establishments.

In response to obtaining a set of attributes, a selecting module 610 selects a set of algorithms corresponding to each attribute belonging to the set of attributes. The set of algorithms includes one or more algorithms for matching an attribute. The one or more algorithms are selected so as to match one or more aspects of an attribute. The one or more aspects corresponding to an attribute can be for example, but are not limited to a Phonetics, Phonometric Scoring, Simmetric/Distance Metrics, Hybrid, Token Swapping, Variation Generator, Exact String Matching, Stemming and Bit matching. In an exemplary embodiment of the present invention, if an attribute is a name, it may be required to match phonetic aspects of the name and edit distance of the name with other entities in reference database 115. Therefore, one or more algorithms for matching phonetic aspects and the edit distance of the name are selected. It will be apparent to a person skilled in the art that there may be any number of aspects of an attribute and a set of algorithms corresponding to the attribute can be selected to match one or more aspects of the attribute based on requirements of a business establishment.

Thereafter, one or more algorithms are executed corresponding to each attribute of the set of attributes by an executing module 615. The one or more algorithms corresponding to an attribute are selected from a set of algorithms corresponding to the attribute. When executed, each algorithm generates an algorithm score corresponding to an attribute. An algorithm score indicates a degree of match between respective attributes of the entities to be matched based on the algorithm. In an embodiment of the present invention, the one or more algorithms can be executed in one or more of a sequential manner and a parallel manner. Executing module 615 is explained in further detail in conjunction with FIG. 7.

In an embodiment of the present invention, system 600 may further include a categorizing module 620. Categorizing module 620 categorizes one or more attributes in one or more attribute categories and one or more algorithms in one or more algorithm categories.

Categorizing module 620 categorizes one or more attributes based on a first predefined criteria and the one or more algorithms are categorized based on a second predefined criteria. As explained earlier, the first predefined criteria include rules for categorizing the one or more attributes in one or more attribute categories. Similarly, the second predefined criteria include rules for categorizing the one or more algorithms in one or more algorithm categories.

Thereafter, a classifying module 625 classifies one or more attributes from an attribute category in one or more attribute groups and one or more algorithms from an algorithm category in one or more algorithm groups. Classifying module 625 classifies one or more attributes based on a third predefined criteria and one or more algorithms based on a fourth predefined criteria.

After classifying module 625 classifies one or more attributes and one or more algorithms, an attribute category weight is associated with an attribute category, an attribute group weight is associated with an attribute group, and an attribute weight is associated with an attribute by an associating module 630. Each of the attribute category weight, the attribute group weight and the attribute weight is associated based on the set of predefined parameters. As explained in conjunction with FIG. 2, the set of predefined parameters can be based on business requirements of a business establishment. Further, in an embodiment of the present invention, each of the attribute category weight, the attribute group weight and attribute weight can either be associated automatically or manually by a domain expert based on business requirements of a business establishment. In an exemplary embodiment of the present invention, the domain expert may execute the set of algorithms on test data to further refine the set of algorithms.

Consequently, the attribute category weight, the attribute group weight and the attribute weight are associated based on a relative importance of the attributes for a business establishment by associating module 630. An attribute with a higher relative importance can be associated with a higher attribute weight compared to other attributes in an attribute group. For example, as mentioned earlier, in the case of a business establishment such as a bank, a middle name attribute from an official name attribute group (including a first name, a middle name and a last name) may be associated with a lower attribute weight compared to either of a first name or a last name attribute. Similarly, an attribute group with a higher relative importance can be associated with a higher attribute group weight compared to other attribute groups in an attribute category. Correspondingly, an attribute category with a higher relative importance can be associated with a higher attribute category weight compared to other attribute categories corresponding to an entity.

In an embodiment of the present invention, the attribute category weight, the attribute group weight and the attribute weight associated by associating module 630 are relative weights. In an embodiment of the present invention, sum of each attribute weight in an attribute group is 100. Similarly, sum of each attribute group weight in an attribute category is 100 and sum of each attribute category weight corresponding to an entity is 100.

In an embodiment of the present invention, associating module 630 is further configured to associate a threshold attribute category score to an attribute category, a threshold attribute group score to an attribute group and a threshold attribute score to an attribute belonging to the set of attributes based on the set of predefined parameters.

Further, an assigning module 635 assigns an algorithm category weight to an algorithm category, an algorithm group weight to an algorithm group and an algorithm weight to an algorithm. Each of the algorithm category weight, the algorithm group weight and the algorithm weight is assigned based on a corresponding attribute. In an embodiment of the present invention, the algorithm category weight, the algorithm group weight and the algorithm weight are assigned by assigning module 635 based on inputs received by a domain expert based on business requirements of a business establishment. As mentioned earlier, each attribute of the set of attributes is associated with a set of algorithms. Each algorithm of a set of algorithms may further be classified in one or more algorithm categories and one or more algorithm groups. Assigning module 635 assigns algorithm category weight to each algorithm category from a set of algorithms based on an attribute corresponding to the set of algorithms.

An algorithm category may comprise one or more algorithms which may have a higher relative importance based on an attribute. Consider an exemplary scenario wherein, an attribute is a first name and a set of algorithms corresponding to the first name is categorized in a first algorithm category and a second algorithm category. The first algorithm category includes algorithms for matching phonetics of the first name.

Further, the second algorithm category includes algorithms for matching edit distance of the first name. The first algorithm category may be assigned a higher relative importance compared to the second algorithm category based on business requirements. Therefore, an algorithm category weight assigned to the first algorithm category is relatively higher than an algorithm category weight assigned to the second algorithm category.

After assigning an algorithm category weight to each algorithm category, each algorithm group from an algorithm category is assigned an algorithm group weight by assigning module 635 based on an attribute associated with a set of algorithms. Similarly, each algorithm in an algorithm group is assigned an algorithm weight by assigning module 635 based on an attribute corresponding to the set of algorithms. In an embodiment of the present invention, assigning module 635 assigns dynamic relative weights to one or more algorithms. As explained earlier, a dynamic relative weight is assigned to an algorithm based on an algorithm score of the algorithm.

In an embodiment of the present invention, the algorithm category weight, the algorithm group weight and the algorithm weight assigned by assigning module 635 are relative weights. In an embodiment of the present invention, sum of each algorithm weight in an algorithm group is 100. Similarly, sum of each algorithm group weight in an algorithm category is 100 and sum of each algorithm category weight corresponding to an attribute is 100.

In an embodiment of the present invention, assigning module 635 is further configured to assign a threshold algorithm category score to an algorithm category, a threshold algorithm group score to an algorithm group and a threshold algorithm score to an algorithm based on the set of attributes.

Figure 7:
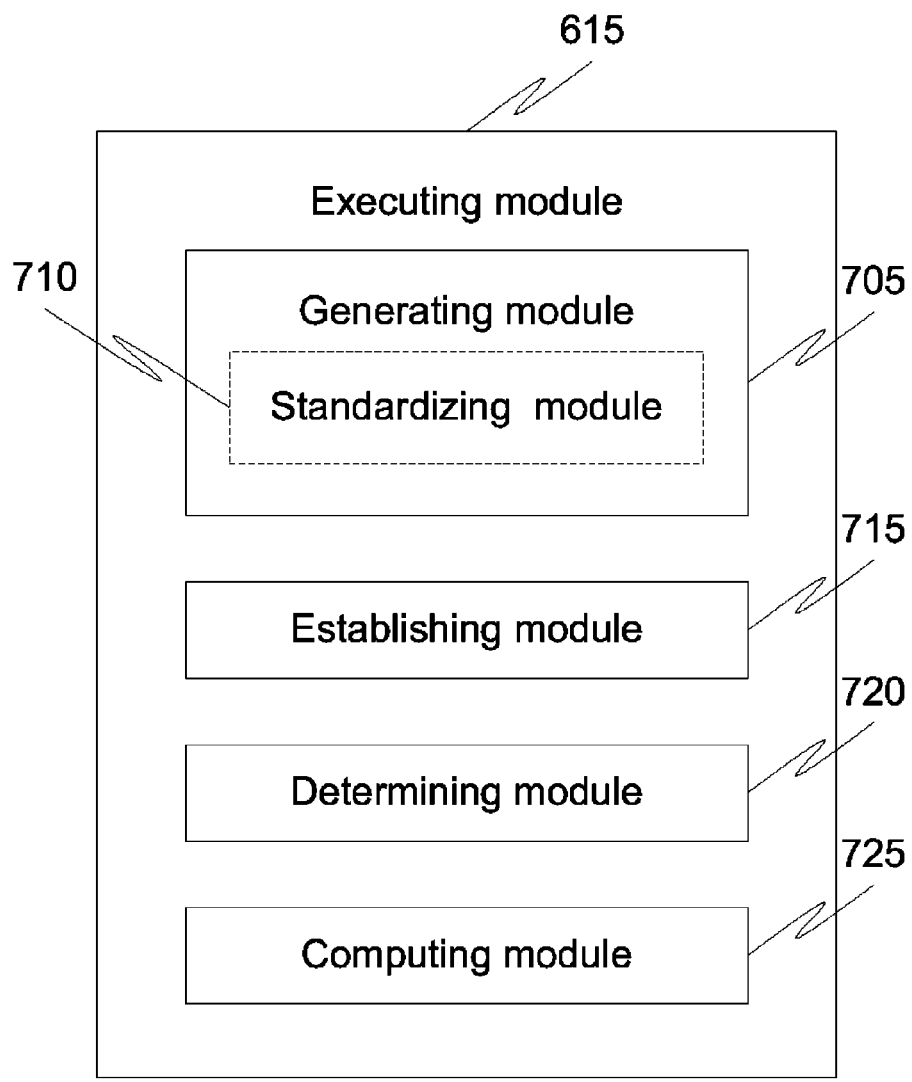
FIG. 7 is a block diagram depicting an executing module for executing one or more algorithms, in accordance with an embodiment of the present invention.

Referring now to FIG. 7, a block diagram depicting executing module 615 for executing one or more algorithms is shown, in accordance with an embodiment of the present invention. Executing module 615 includes a generating module 705 that generates one or more algorithm scores corresponding to one or more attributes. The one or more attributes belong to a set of attributes. Executing module 615 uses one or more algorithms belonging to one or more algorithm groups. As mentioned earlier, an attribute is associated with a set of algorithms. Generating module 705 executes one or more algorithms from the set of algorithms for generating an algorithm score corresponding to each of the one or more algorithms.

An algorithm score, as generated by generating module 705, corresponding to an algorithm can be based on any scale depending on the algorithm. For example, a first algorithm may result in a first algorithm score on a 1000 point scale, and a second algorithm may result in a second algorithm score on a –100 point scale. In an embodiment of the present invention, generating module 705 includes a standardizing module 710 for standardizing the algorithm scores on a common scale based on business requirements of a business establishment. In an embodiment of the present invention, standardizing module 710 can scale one or more algorithm scores using a score scaling method. In another embodiment of the present invention, standardizing module 710 can standardize one or more algorithm scores using a score normalization method. In a further embodiment of the present invention, standardizing module 710 can use each of a score normalization method and a score scaling method for standardizing one or more algorithm scores. In an embodiment of the present invention, standardizing module 710 can be integrated with generating module 705. In another embodiment of the present invention, standardizing module 710 can be integrated with executing module 615.

Thereafter, an establishing module 715 establishes one or more algorithm group scores corresponding to one or more algorithm groups. The one or more algorithm group scores are established using each of, one or more algorithm scores as generated by generating module 705 and one or more algorithm weights as assigned by assigning module 635. In an embodiment of the present invention each of the one or more algorithm group scores is a weighted average algorithm group score. The weighted average algorithm group score can be established by calculating a weighted average of algorithm scores using algorithm weights of algorithms in an algorithm group. In an embodiment of the present invention, the weighted average algorithm group score is established by calculating a weighted average of algorithm scores using dynamic algorithm weights of algorithms in an algorithm group. As mentioned earlier, a dynamic algorithm weight of an algorithm is based on algorithm score of the algorithm.

Further, a determining module 720 determines an algorithm category score corresponding to each algorithm category. An algorithm category score is determined using each of, one or more algorithm group scores as established by establishing module 715 and one or more algorithm group weights as assigned by assigning module 635. In an embodiment of the present invention, each algorithm category score is a weighted average algorithm category score. The weighted average algorithm category score can be calculated by taking a weighted average of algorithm group scores using algorithm group weights of one or more algorithm groups in an algorithm category. In an embodiment of the present invention, the weighted average algorithm category score is computed by calculating a weighted average of algorithm group scores using dynamic algorithm group weights of algorithm groups. A dynamic algorithm group weight of an algorithm group is based on algorithm group score of the algorithm group.

Thereafter, a computing module 725 computes an attribute score corresponding to each attribute belonging to a set of attributes. Computing module 725 computes an attribute score corresponding to an attribute based on one or more algorithm category scores corresponding to the attribute. An attribute score is computed using each of, one or more algorithm category scores as determined by determining module 720 and one or more algorithm category weights as assigned by assigning module 635. In an embodiment of the present invention, each attribute score is a weighted average attribute score. A weighted average attribute score for an attribute can be calculated by taking a weighted average of algorithm category scores using algorithm category weights of each algorithm category corresponding to the attribute. In an embodiment of the present invention, the weighted average attribute score is computed by calculating a weighted average of algorithm category scores using dynamic algorithm category weights of algorithm categories. A dynamic algorithm category weight of an algorithm category is based on algorithm category score of the algorithm category.

In an embodiment of the present invention, computing module 725 is further configured for obtaining an attribute group score corresponding to each attribute group. Each attribute group score is obtained using each of, one or more attribute scores and one or more attribute weights as associated by associating module 630. In an embodiment of the present invention, each attribute group score is a weighted average attribute score. A weighted average attribute group score is obtained by calculating a weighted average of attribute scores using attribute weights of each attribute in an attribute group. In an embodiment of the present invention, the weighted average attribute group score is computed by calculating a weighted average of attribute scores using dynamic attribute weights. A dynamic attribute weight of an attribute is based on attribute score of the attribute.

In an embodiment of the present invention, after obtaining an attribute group score corresponding to each attribute group, an attribute category score corresponding to each attribute category is determined by computing module 725. An attribute category score is determined using each of, one or more attribute group scores and one or more attribute group weights as associated by associating module 630. In an embodiment of the present invention, each attribute category score, as determined by computing module 725, is a weighted average attribute category score. A weighted average attribute category score can be determined by calculating a weighted average of attribute group scores using attribute group weights of each attribute group in an attribute category. In an embodiment of the present invention, the weighted average attribute category score is determined by calculating a weighted average of attribute group scores using dynamic attribute group weights of attribute groups. A dynamic attribute group weight of an attribute group is based on attribute group score of the attribute group.

Computing module 725 further calculates an entity matching score of the entity corresponding to each entity of a reference database. An entity matching score corresponding to an entity is calculated based on corresponding one or more attribute category scores. The entity matching score is computed using each of, one or more attribute category scores and one or more attribute category weights as associated by associating module 630. In an embodiment of the present invention, an entity matching score is a weighted average entity matching score. A weighted average entity matching score for an entity can be computed by calculating a weighted average of attribute category scores using attribute category weights of each attribute category corresponding to the entity. In an embodiment of the present invention, the weighted average entity matching score is computed by calculating a weighted average of attribute category scores using dynamic attribute category weights of attribute categories. A dynamic attribute category weight of an attribute category is based on attribute category score of the attribute category.

In an embodiment of the present invention, computing module 725 displays the entity matching score to a user in order to get it verified by the user. Further, computing module 725 can validate the entity if one or more entity matching scores are more than a predefined threshold entity matching score.

The method for facilitating verification of an entity against a reference database based on business requirements, as described in the present invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the present invention. The computing device executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the computing device to perform specific tasks such as the steps that constitute the method of the present invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the computing device may be in response to user commands, or in response to results of previous processing or in response to a request made by another computing device.

Various embodiments of the present invention provide method and system for facilitating verification of an entity against a reference database based on business requirements. The method and system of the present invention allow a user to assign weights to one or more attributes and one or more algorithms based on requirements of a business establishment for entity matching. This helps in reducing the chances of errors in matching an entity by mitigating the effect of weak algorithms. The method and system of the present invention also increases the flexibility of a user for addressing the changing needs of a business establishment. Further, the method and system of the present invention also helps in minimizing false negatives and false positives in entity matching.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for facilitating verification of an entity against a reference database, wherein the entity comprises a plurality of attributes and the reference database comprises a plurality of entities, the method comprising:

obtaining a set of attributes from the plurality of attributes based on a set of predefined parameters;

selecting a set of algorithms corresponding to each attribute belonging to the set of attributes;

categorizing at least one attribute belonging to the set of attributes in at least one attribute category and at least one algorithm belonging to the set of algorithms in at least one algorithm category, wherein the at least one attribute is categorized based on a first predefined criteria and the at least one algorithm is categorized based on a second predefined criteria;

classifying the at least one attribute from an attribute category in at least one attribute group and the at least one algorithm from an algorithm category in at least one algorithm group, wherein the at least one attribute is classified based on a third predefined criteria and the at least one algorithm is classified based on a fourth predefined criteria;

associating an attribute category weight to an attribute category, an attribute group weight to an attribute group and an attribute weight to an attribute belonging to the set of attributes based on the set of predefined parameters;

assigning an algorithm category weight to an algorithm category, an algorithm group weight to an algorithm group and an algorithm weight to an algorithm based on the set of attributes; and executing at least one algorithm belonging to a set of algorithms corresponding to each attribute.

2. The method of claim 1, wherein at least one of an attribute category weight, an attribute group weight and an attribute weight is a dynamic relative weight.

3. The method of claim 1, wherein at least one of an algorithm category weight, an algorithm group weight and an algorithm weight is a dynamic relative weight.

4. The method of claim 1 further comprises:
a. associating a threshold attribute category score to an attribute category, a threshold attribute group score to an attribute group and a threshold attribute score to an attribute belonging to the set of attributes based on the set of predefined parameters; and
b. assigning a threshold algorithm category score to an algorithm category, a threshold algorithm group score to an algorithm group and a threshold algorithm score to an algorithm based on the set of attributes.

5. The method of claim 1, wherein the at least one algorithm is executed in at least one of a sequential manner and a parallel manner.

6. The method of claim 1, wherein the executing step comprises:
a. generating at least one algorithm score corresponding to each attribute belonging to the set of attributes using at least one algorithm corresponding to the at least one attribute and belonging to at least one algorithm group;
b. establishing an algorithm group score corresponding to each algorithm group in response to generating the at least one algorithm score;
c. determining an algorithm category score corresponding to each algorithm category based on an algorithm group score corresponding to each algorithm group; and
d. computing an attribute score corresponding to each attribute of the set of attributes based on at least one algorithm category score.

7. The method of claim 6, wherein the computing step further comprises:
a. obtaining an attribute group score corresponding to each attribute group based on an attribute score corresponding to each attribute;
b. determining an attribute category score corresponding to each attribute category based on an attribute group score corresponding to each attribute group; and
c. calculating an entity matching score of the entity corresponding to each entity of the reference database based on corresponding each attribute category score.

8. The method of claim 7, wherein the computing step further comprises:
a. displaying each entity matching score of the entity corresponding to each entity of the reference database to a user; and
b. validating the entity if at least one entity matching score is more than a predefined threshold entity matching score.

9. The method of claim 6, wherein the at least one algorithm score is standardized using at least one of a score scaling method and a score normalization method.

10. A system for facilitating verification of an entity against a reference database, wherein the entity comprises a plurality of attributes, and the reference database comprises a plurality of entities, the system comprising:

a. an obtaining module obtaining a set of attributes from the plurality of attributes based on a set of predefined parameters;
b. a selecting module selecting a set of algorithms corresponding to each attribute belonging to the set of attributes; and
c. an executing module executing at least one algorithm belonging to a set of algorithms corresponding to each attribute, the executing module comprises:
a generating module generating at least one algorithm score corresponding to each attribute of the set of attributes using the at least one algorithm belonging to the at least one algorithm group;
an establishing module establishing an algorithm group score corresponding each algorithm group in response to generating the at least one algorithm score;
a determining module determining an algorithm category score corresponding to each algorithm category based on an algorithm group score corresponding to each algorithm group; and
a computing module computing an attribute score corresponding to each attribute of the set of attributes based on at least one algorithm category score.

11. The system of claim 10 further comprises: a. a categorizing module, the categorizing module configured to: i. categorize at least one attribute belonging to the set of attributes in at least one attribute category based on a first predefined criteria, wherein an attribute category comprises at least one attribute; and ii. categorize at least one algorithm belonging to the set of algorithms in at least one algorithm category based on a third predefined criteria, wherein an algorithm category comprises at least one algorithm; b. a classifying module, the classifying module configured to: i. classify the at least one attribute from an attribute category in at least one attribute group based on a second predefined criteria, wherein an attribute group comprises at least one attribute; and ii. classify the at least one algorithm from an algorithm category in at least one algorithm group based on a fourth predefined criteria, wherein an algorithm group comprises at least one algorithm.

12. The system of claim 11 further comprises: a. an associating module associating an attribute category weight to each attribute category, an attribute group weight to each attribute group and an attribute weight to each attribute belonging to the set of attributes based on the predefined parameters; and b. an assigning module assigning an algorithm category weight to an algorithm category, an algorithm group weight to an algorithm group and an algorithm weight to an algorithm based on the set of attributes.

13. The system of claim 12, wherein the associating module is further configured to associate a threshold attribute category score to an attribute category, a threshold attribute group score to an attribute group and a threshold attribute score to an attribute belonging to the set of attributes based on the set of predefined parameters.

14. The system of claim 12, wherein the assigning module is further configured to assign a threshold algorithm category score to an algorithm category, a threshold algorithm group score to an algorithm group and a threshold algorithm score to an algorithm based on the set of attributes.

15. The system of claim 10, wherein the computing module is further configured to:
a. obtain an attribute group score corresponding to each attribute group based on an attribute score corresponding to each attribute;

b. determine an attribute category score corresponding to each attribute category based on an attribute group score corresponding to each attribute group; and c. calculate an entity matching score of the entity corresponding to each entity of the reference database based on corresponding attribute category score.

16. The system of claim 15, wherein the computing module is further configured to: a. display each entity matching score of the entity corresponding to each entity of the reference database to a user; and b. validate the entity if at least one entity matching score is more than a predefined threshold entity matching score.

17. The system of claim 10, wherein the generating module comprises a standardizing module for standardizing the at least one algorithm score using at least one of a score scaling method and a score normalization method.

18. A computer program product comprising a computer usable medium having a computer readable program embodied therein for, facilitating verification of an entity against a reference database, wherein the entity comprises a plurality of attributes, and the reference database comprises a plurality of entities, the computer readable program includes at least one component to:

obtain a set of attributes from the plurality of attributes based on a set of predefined parameters;

select a set of algorithms corresponding to each attribute belonging to the set of attributes;

categorize at least one attribute belonging to the set of attributes in at least one attribute category and at least one algorithm belonging to the set of algorithms in at least one algorithm category, wherein the at least one attribute is categorized based on a first predefined criteria and the at least one algorithm is categorized based on a second predefined criteria;

classify the at least one attribute from an attribute category in at least one attribute group and the at least one algorithm from an algorithm category in at least one algorithm group, wherein the at least one attribute is classified based on a third predefined criteria and the at least one algorithm is classified based on a fourth predefined criteria;

associate an attribute category weight to an attribute category, an attribute group weight to an attribute group and an attribute weight to an attribute belonging to the set of attributes based on the set of predefined parameters;

assign an algorithm category weight to an algorithm category, an algorithm group weight to an algorithm group and an algorithm weight to an algorithm based on the set of attributes; and execute at least one algorithm belonging to a set of algorithms corresponding to each attribute.

19. The computer program product of claim 18, further comprising additional components to:

calculate a matching score for said entity based on the respective weights associated with the attributes, the attribute category, attribute group, the algorithms, the algorithm group.

20. The system of claim 10, wherein said computing module calculates a matching score for said entity based on the respective weights associated with the attributes, the attribute category, attribute group, the algorithms, the algorithm group.

21. The method of claim 1, further comprising calculating a matching score for said entity based on the respective weights associated with the attributes, the attribute category, attribute group, the algorithms, the algorithm group.

* * * * *